(12) United States Patent
Parizhsky et al.

(10) Patent No.: US 11,303,598 B2
(45) Date of Patent: *Apr. 12, 2022

(54) SYSTEM AND METHOD FOR REGULATING ELECTRONIC MESSAGE TRANSMISSIONS

(71) Applicant: Intercontinental Exchange Holdings, Inc., Atlanta, GA (US)

(72) Inventors: Vladimir Parizhsky, New York, NY (US); Alexei Lebedev, New York, NY (US); Robert Cornish, Jersey City, NJ (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,613

(22) Filed: Aug. 3, 2021

(65) Prior Publication Data
US 2021/0367912 A1 Nov. 25, 2021

Related U.S. Application Data

(63) Continuation of application No. 17/226,155, filed on Apr. 9, 2021, now Pat. No. 11,115,364, which is a continuation of application No. 17/144,362, filed on Jan. 8, 2021, now Pat. No. 11,005,800, which is a continuation of application No. 17/003,006, filed on
(Continued)

(51) Int. Cl.
| | | |
|---|---|---|
| *H04L 12/58* | (2006.01) | |
| *G06Q 10/10* | (2012.01) | |
| *H04L 51/222* | (2022.01) | |
| *H04L 51/00* | (2022.01) | |
| *H04L 51/226* | (2022.01) | |

(52) U.S. Cl.
CPC .............. *H04L 51/20* (2013.01); *H04L 51/12* (2013.01); *H04L 51/14* (2013.01); *H04L 51/26* (2013.01); *G06Q 10/107* (2013.01)

(58) Field of Classification Search
CPC ......... H04L 51/20; H04L 51/12; H04L 51/14; H04L 51/26
See application file for complete search history.

(56) References Cited

U.S. PATENT DOCUMENTS

| | | | |
|---|---|---|---|
| 5,889,765 A | 3/1999 | Gibbs | |
| 6,097,930 A * | 8/2000 | Hill | H04H 20/67 340/7.26 |

(Continued)

*Primary Examiner* — Minh Chau Nguyen
(74) *Attorney, Agent, or Firm* — DLA Piper LLP (US)

(57) ABSTRACT

Systems and methods for regulating electronic messages transmissions. A message delay system is disposed between one or more first entities and a second entity within at least one network. Electronic messages are received from among at least one the first entities and the second entity at one or more message arrival times. A message delay component applies a delay to each received electronic message, based on a predefined delay time common to all of the first entities and a first entity delay offset associated with a first entity that is associated with the received message. The first entity delay offset is based on a geographical origin of the first entity relative to a geographical origin of the second entity. Each delayed message is transmitted to a designated recipient via the network, where the designated recipient is among the second entity and the first entities.

28 Claims, 12 Drawing Sheets

Related U.S. Application Data

Aug. 26, 2020, now Pat. No. 10,944,709, which is a continuation of application No. 16/910,142, filed on Jun. 24, 2020, now Pat. No. 10,819,670, which is a continuation of application No. 16/819,573, filed on Mar. 16, 2020, now Pat. No. 10,749,830, which is a continuation of application No. 16/160,299, filed on Oct. 15, 2018, now Pat. No. 10,645,050, which is a continuation of application No. 15/668,485, filed on Aug. 3, 2017, now Pat. No. 10,218,658.

(60) Provisional application No. 62/464,721, filed on Feb. 28, 2017.

(56) References Cited

U.S. PATENT DOCUMENTS

| | | |
|---|---|---|
| 6,272,190 B1 | 8/2001 | Campana, Jr. |
| 8,718,482 B1 * | 5/2014 | Roberts ............... H04L 7/0075 398/161 |
| 2003/0163593 A1 * | 8/2003 | Knightly ............. H04L 47/762 709/251 |
| 2007/0053339 A1 | 3/2007 | Peisa et al. |
| 2008/0212516 A1 | 9/2008 | Son et al. |
| 2015/0073967 A1 | 3/2015 | Katsuyama et al. |
| 2015/0302441 A1 * | 10/2015 | Katsuyama ........ G06Q 30/0206 705/7.35 |
| 2016/0055581 A1 | 2/2016 | Katsuyama et al. |

\* cited by examiner

SYSTEM AND METHOD FOR REGULATING ELECTRONIC MESSAGE TRANSMISSIONS

TECHNICAL FIELD

The present disclosure relates generally to improving electronic message communication and, in particular, to systems and methods of controlling electronic message transmissions routed from various geographical originations with different transmission times such that the messages arrive at a destination entity at a similar time.

BACKGROUND

Communication networks (e.g., computer networks, the internet) have brought the world together. Through one or more communication networks, entities (via computing devices) from practically any region of the world have the ability to exchange data with each other, regardless of whether the computing devices have a direct connection to each other. However, problems still exist with communication networks. Communication networks may differ in network properties, for example, with respect to transmission medium for carrying signals through the network (e.g., optical fiber, electrical cable, wireless, etc.), communication protocols to organize network traffic (e.g., Ethernet, wireless local area network (WLAN), Internet Protocol Suite (i.e., transmission control protocol (TCP)/Internet Protocol (IP)), digital cellular standards (e.g., global system for mobile communications (GSM)), etc.), network size, topology (e.g., bus, star, ring, mesh, fully connected, tree, etc.) and organizational intent (e.g., intranet, extranet, internet, internetwork, etc.). These differences in network properties, connections between networks, the geographic origin of the originating computing device and the geographic destination of the destination computing device can all impact the speed at which data is transferred between computing devices. Thus, two or more computing devices (for example, at different geographical origins and/or having different communication protocols) may transmit data at the same time, but this data (from both devices) may reach a destination computing device at different times.

There is a need for improving electronic communication in communication networks, to reduce the effects of differing network properties and geographic origin on electronic message transmission, such that some computing devices are not placed at a disadvantage compared with other computing devices with respect to message transmission speed.

SUMMARY

Aspects of the present disclosure relate to systems and methods for control of electronic message transmissions. The system includes one or more first entities configured to be communicatively coupled to a second entity via at least one network, and a message delay system disposed between the one or more first entities and the second entity within the at least one network. Each first entity is configured to exchange electronic messages with the second entity. The message delay system includes an input interface, a message delay component and an output interface. The input interface is configured to receive the electronic messages from among at least one of the one or more first entities and the second entity at one or more message arrival times, via the at least one network. The message delay component is configured to apply a delay to each received electronic message. The applied delay, to each received electronic message, is based on a predefined delay time common to all of the first entities and a first entity delay offset associated with a first entity among the one or more first entities that is associated with the received electronic message. The first entity delay offset is based on a geographical origin of the first entity relative to a geographical origin of the second entity. The output interface is configured to transmit each delayed message to a designated recipient via the at least one network, where the designated recipient is among the second entity and the one or more first entities.

Aspects of the present disclosure also relate to systems for control of electronic message transmissions. The system includes a first entity configured to be communicatively coupled to a second entity via at least one network, and a message delay system disposed between the first entity and the second entity within the at least one network. The first entity and the second entity are configured to exchange electronic messages. The message delay system is configured to receive an electronic message of the electronic messages from among the first entity and the second entity, via the at least one network. The electronic message includes a designated recipient. The message delay system is also configured to control, via a message delay component, transmission of the received electronic message to the designated recipient via the at least one network, by delaying the received electronic message according to a predetermined delay. The predetermined delay is associated with a delay time common to entities including the first entity and a delay offset specifically associated with the first entity. The predetermined delay is based on at least one of a geographical origin of the first entity, a geographical origin of the second entity, a message propagation time along a data path between the first entity and the second entity, one or more network properties of the first entity, one or more network properties of the second entity, one or more messaging attributes of the received electronic message, one or more further attributes in the received electronic message and one or more network properties of the at least one network.

DETAILED DESCRIPTION

Aspects of the present disclosure generally relate to systems and methods of controlling electronic communication message transmissions between sender and destination entities, that takes into account geographical distances between the sender and destination entities. In some examples, the control mechanism includes a message delay line system that incorporates a sender specific delay offset, such that messages sent from different geographical distances at the same time arrive at the destination entity at similar times, regardless of differences in message transmission times due to differences in geographical distances, differences in transmission routes, communication mediums and other communication network properties.

In some examples, the message delay line system may include at least one software-delay line element (SDLE) arrangement that may rearrange incoming messages in a message queue according to a departure time based on a predefined delay time common to all sender entities and a sender specific delay offset. In some examples, the message delay line system may include at least one hardware delay line element (HDLE) arrangement that may be configured to apply a hardware based delay corresponding the departure time to the received messages in accordance with the corresponding sender entity. In some examples, the message delay line system may include one or more SDLE and HDLE arrangements. In some examples, the sender specific delay offset may be measured based on a travel time for a data packet along a data packet path between a client ingress point (CIP) and a downstream system ingress point (DIP). In some examples, the delay offset may be measured using a passive CIP configuration. In some examples, the delay offset may be measured using an active CIP configuration including according to out-of-band and/or in-band techniques.

Figure 1:
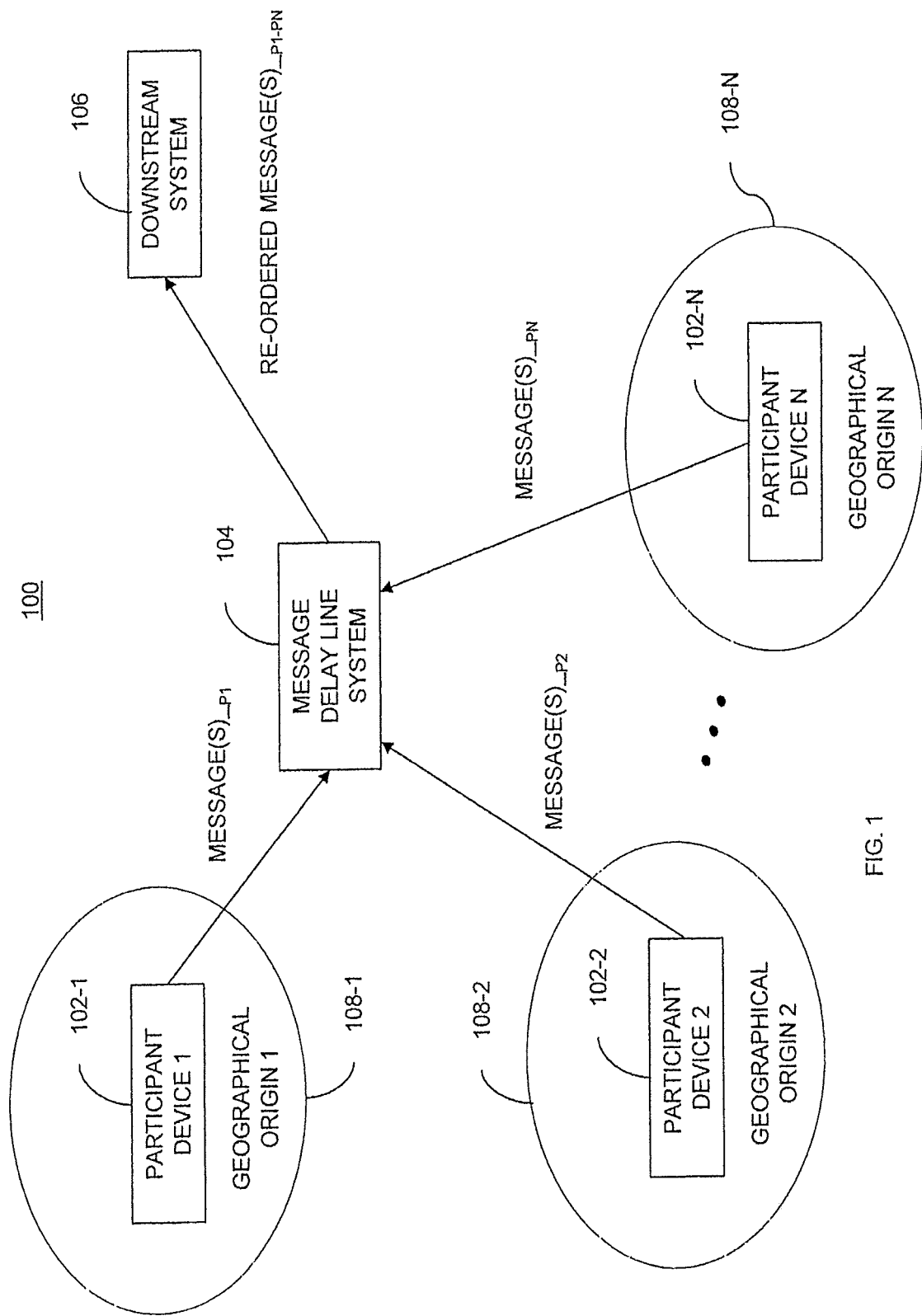
FIG. 1 is a functional block diagram of an example electronic message communication environment including an example message delay line system, according to an aspect of the present disclosure.

Turning now to FIG. 1, FIG. 1 is a functional block diagram illustrating example electronic message communication environment 100 for controlled delivery of electronic messages between entities, according to aspects of the present disclosure. Environment 100 may include one or more participant devices 102 (i.e., participant device 102-1, . . . , participant device 102-N, where N is an integer greater than or equal to 1), message delay line system 104 and at least one downstream system 106. Each of participant devices 102, message delay line system 104 and downstream system 106 may comprise one or more computing devices, including a non-transitory memory storing computer-readable instructions executable by a processing device to perform the functions described herein. Although the description herein describes environment 100 having three or more participant devices 102, in some examples, environment 100 may include one participant device 102 (i.e., where N is equal to 1).

Participant devices 102, message delay line system 104 and downstream system(s) 106 may be communicatively coupled via one or more networks (not shown). The at least one network may include, for example, a private network (e.g., a local area network (LAN), a wide area network (WAN), intranet, etc.) and/or a public network (e.g., the internet). Although FIG. 1 illustrates one downstream system 106, in some examples, environment 100 may include more than one downstream system 106, each electronically coupled to message delay line system 104 via at least one network.

Participant devices 102 may be configured to transmit electronic communication messages (also referred to herein as "electronic messages" or "messages") directed to downstream system 106. For example, participant device 102-1 (associated with Participant 1 (P1)) may transmit one or more messages$_{P1}$, participant device 102-2 (associated with Participant 2 (P2)) may transmit one or more messages$_{P2}$ and participant device 102-N (associated with Participant N (PN)) may transmit one or more messages$_{PN}$. Although not shown, downstream system 106 may similarly transmit electronic messages directed to one or more of participant devices 102 (and/or to another downstream system (not shown)).

In some examples, message delay line system 104 may be configured to receive messages that are explicitly directed to message delay line system 104 (with an indication in the message of a final destination), and message delay line system 104 may transmit the messages to their final destination (e.g., downstream system 106) according to a corresponding departure time delay. In some examples, message delay line system 104 may intercept messages that are explicitly directed to a destination other than message delay line system 104 (e.g., downstream system 106), and message delay line system 104 may transmit the intercepted messages to their destination(s) according to a departure time delay.

Participant devices 102 may comprise a desktop computer, a laptop, a smartphone, tablet, or any other user device known in the art. A participant may interact with participant device 102, for example, via a graphical user interface (not shown) displayed on any type of display device including a computer monitor, a smart-phone screen, tablet, a laptop screen or any other device providing information to a participant. Participant devices 102 may include any suitable user interface, user input component(s), output component(s), and communication component(s) for creation and transmission and receipt of electronic communication messages. The electronic communication messages may include, without being limited to, instant messages, personal messages, text messages and email.

Each participant device 102 may be located within a geographical origin 108. For example, participant device 102-1 may be located within geographical origin 108-1, participant device 102-2 may be located within geographical origin 108-2 and participant device 102-N may be located within geographical origin 108-N. FIG. 1 illustrates one example where each participant device 102 is within a different geographical origin 108 (e.g., 108-1, 108-2, 108-N). In some examples, two or more participant devices 102 may be located within a same geographical origin 108. In some examples, geographic origin 108 may represent an actual location of a particular participant device 102. In some examples, geographic origin 108 may represent an area in which the particular device 102 is located (e.g., a 10 km radius). In some examples, one or more of geographical origins 108 may be co-located with message delay line system 104 and/or downstream system 106.

Each geographical origin 108 may be associated with a predetermined travel time associated with routing an electronic message from geographical origin 108 to message delay line system 104 (and, ultimately to downstream system(s) 106). The predetermined travel time for an electronic message from a particular geographic origin (e.g., 108-1) may be based on, for example, a geographical distance between participant device 102 and message delay system 104, a communication medium(s) through which the electronic message travels, any network propagation delay(s), other network parameters (e.g., communication protocol, network size, topology, organizational intent), etc. In some examples, a geographical origin 108 may be co-located with downstream system(s) 106 and may have minimal travel time. In some examples, a geographical origin 108 may be differently located and may have a longer travel time. Thus, without message delay line system 104, two messages (e.g., message$_{-P1}$ and message$_{-P2}$ transmitted at the same time from different geographical origins (e.g., origin 108-1, for example, in Frankfurt, Germany and origin 108-2, for example, in Chicago, Ill., USA) may reach downstream system 106 (for example, located in Mahwah, N.J., USA) at different times.

Downstream system 106 may be configured to receive electronic messages from among participant device(s) 102, as well as from one or more other downstream system (not shown). In some examples, downstream system 106 may comprise an electronic exchange system. In such examples, electronic messages from participant device(s) 102 may include, for example, order data (e.g., bid and/or offer data) for one or more assets. Electronic messages from downstream system 106 may include, for example, market data information, transaction information, etc. In one particular non-limiting implementation, an electronic exchange system may refer to an electronic asset exchange system or device such as a commodities exchange, a futures execution facility, an options exchange, a cash equities exchange, a swap execution facility, an electronic transaction execution venue or any other type of an exchange venue known in the art. In some examples, an electronic exchange system may refer to a simple data transfer/exchange system. In some examples, downstream system 106 may include any system or device configured to process information in messages, where the information in the electronic messages may be time sensitive. For example, downstream system 106 may include an online travel reservation venue, an online retail shopping site, an electronic auction, etc.

Figure 13:
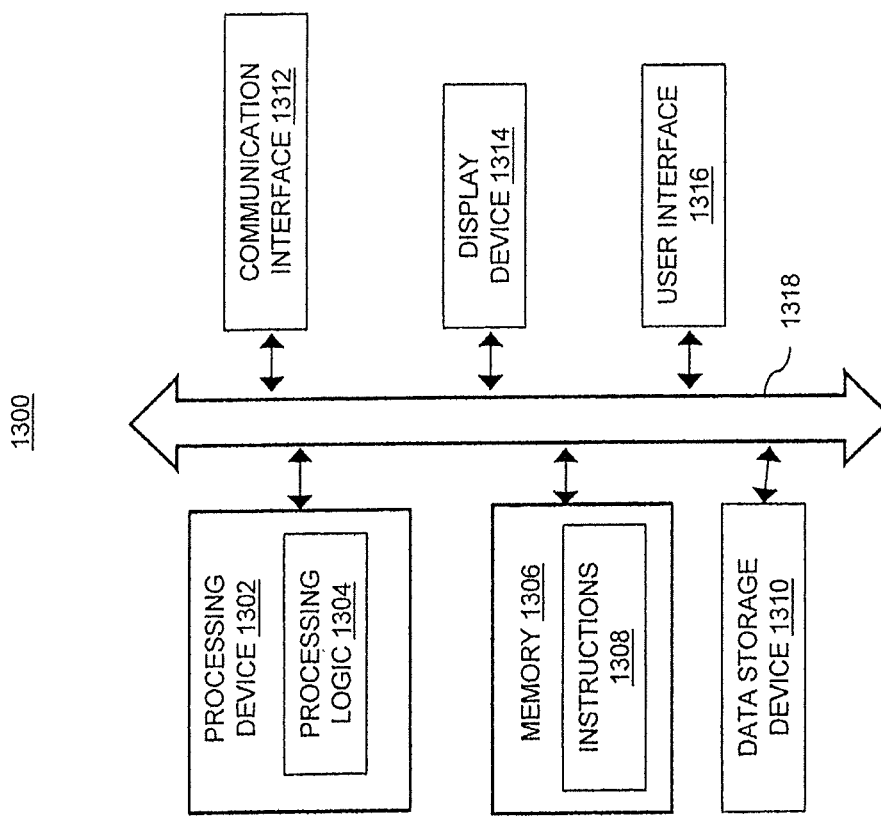
FIG. 13 is a functional block diagram of an example computer system, according to an aspect of the present disclosure.

Downstream system 106 may comprise one or more processors configured to execute instructions stored in a non-transitory memory (such as shown in FIG. 13). Downstream system 106 may be embodied on a single computing device, while in other embodiments, downstream system 106 may refer to a plurality of computing devices housed in one or more facilities that are configured to jointly provide local or remote computing services to one or more participants or participant devices 102. In general, downstream system 106 may send and receive data from participant devices 102, data servers, or any other type of computing devices or entities over the internet, over a Wi-Fi connection, over a cellular network or via any other wired or wireless connection or network known in the art.

In general, the type of data included in the electronic communication messages between participant devices 102 and downstream system 106 may depend on the particular implementation. In general, downstream system 106 may include any system (e.g., one or more computing devices) for performing one or more processes based on data in the received messages. Message delay line system 104 may be implemented, for example, with any downstream system where it may be beneficial to delay messages from participants having different travel times, such that the electronic messages arrive at the downstream system 106 at a similar or same time (or such that electronic message(s) from downstream system 106 to one or more participant device(s) 102 may be delayed).

Message delay line system 104 may be configured to receive incoming messages from among participant devices 102 and/or another downstream system, determine a delayed departure time for each message, and control delivery of each message to a destination (e.g., downstream system 106 or participant device(s) 102) based on the delayed departure time. In the examples below, message delay line system 104 is described as receiving incoming messages from participant devices 102 and transmitting these messages to downstream system 106 after re-ordering the messages by respective delayed departure times. It is understood that message delay line system 104 may be configured to implement a similar delayed departure time transmission procedure for outgoing messages from downstream system 106 to one or more participant devices 102.

Each incoming electronic message to message delay line system 104 may indicate a message sender (e.g., a participant device 102 such as participant device 102-1 or downstream system 106), the geographic origin 108 of the sender (e.g., geographic origin 108-1) and a destination (e.g., message recipient). In some examples, the electronic messages may be encrypted. The sender and the geographical origin may be used by message delay line system 104 to determine the message departure time delay.

The (delayed) departure time ($T_{departure}$) may be based on a common delay time ($T_{delay}$) and a (negative) participant delay offset ($T_{participant}$), such that:

$$T_{departure} = T_{arrival} + T_{delay} - T_{participant} \qquad (1)$$

The common delay time ($T_{delay}$) is applied equally to each participant regardless of geographic origin 108. The participant delay offset is based on the particular geographic origin 108 of a particular participant device 102 (e.g., geographic origin 108-1 of participant device 102-1).

Each delay (e.g., $T_{delay}$ and $T_{participant}$) may be determined based on a geographical distance between participant device 102 and downstream system 106, a communication medium(s) through which the electronic message travels, as well as any network propagation delay(s). For example, a 10 µs delay in time may be equivalent to 1 km of optical fiber length or 3 km of light in vacuum propagation. In the examples, it is assumed that message delay line system 104 is co-located with downstream system 106, such that the distance to downstream system 106 is the same as the distance to message delay line system 104. In examples where message delay line system 104 and downstream system 106 are not co-located, it is understood that message delay line system 104 may factor any additional delay to downstream system 106 in its determination of the departure time.

The common message delay ($T_{delay}$) may represent a fair access area for participant devices located within a particular area centered on a location of downstream system 106. For example, a common $T_{delay}$ of 500 µs corresponds to a distance (e.g., radius) of 150 km that it takes light travels in a vacuum. Thus, adding $T_{delay}$ to an incoming message corresponds to moving all message senders away from downstream system 106 by the same distance (e.g. 150 km).

The participant delay offset ($T_{participant}$) corresponds to a geographical delay credit (GDC) that may be assigned to participant devices, to compensate for submitting the electronic message for a geographic origin 108 that is not co-located with downstream system 106 (e.g., participant device 102-1 may be farther away from downstream system 106 compared to participant device 102-2 and its electronic message would be subject to a longer travel time). The participant delay offset may range from 0 µs (e.g., when participant device 102 is co-located with downstream system 106) to a maximum delay offset of ($T_{delay}$). In some examples, the GDC may be based on a network propagation delay-(the amount of time light takes to travel through the communication medium for the geographical distance between geographical origin 108 and downstream system 106). In some examples, the GDC may also be adjusted for some message senders (e.g., another downstream system such as another electronic exchange), so that data in these messages can be processed faster. Measurement and application of the participant delay offset for various system configurations is described further below with respect to FIGS. 7-12.

Accordingly, the departure time for a participant device 102 co-located at downstream system 106 may be based on $T_{delay}$ only (because $T_{participant}$ is set to zero). A participant device 102 located farther away from downstream system 106 may include a participant delay offset ($T_{participant}$) that reduces the common delay time applied to the incoming message arrival time. When the distance from downstream system is great enough, the participant delay offset equals the common delay time (i.e., $T_{participant}=T_{delay}$) and no delay may be applied to the message departure time. As another example, when $T_{delay}$ is the same for all arriving messages, and $T_{participant}$ is zero for all incoming messages, all messages leave system 104 in the order of arrival. When, however, $T_{delay}$ stays the same but $T_{participant}$ varies from message to message (per participant device 102), system 104 may potentially re-order the incoming messages. For example, earlier arrivals by participant device 102-1 may be transmitted from system 104 after a later arrived message from participant device 102-2).

Thus, message delay line system 104 may control the departure time of messages based on the geographical origin(s) 108 of participant devices 102, with less delay applied to farther geographical origins 108 and more delay applied to closer geographical origins 108 relative to downstream system 106. In this manner, each electronic message (that is transmitted at the same time) may be received by downstream system 106 at a same or similar time, regardless of the geographic origin 108 (and routing path). Accordingly, the departure time ($T_{departure}$) incorporates a smart delay that may eliminate any proximity advantage by participant devices 102. Thus, message delay line system 104 may be configured to mitigate any co-location advantages by some participant devices 102 compared to other participant devices at different geographic origins 108.

Geographic origins 108, message senders (e.g., participant devices 102, downstream system 106, other downstream system(s)), communication mediums and network propagation delays may be predetermined by message delay line system 104 and used to set a common (predefined) delay time $T_{(delay)}$ for all senders, and to set a participant delay offset ($T_{participant}$) associated with each message sender (e.g., each participant device 102, downstream system 106, another downstream system). The participant delay offsets for each sender and geographic origin 108 may be stored, for example, in a look-up table stored in a database (such as database 216 shown in FIG. 2).

In operation, message delay line system 104 may timestamp each incoming message, identify a sender of the time-stamped message (e.g., participant device 102-1) and identify a geographic origin of the message (e.g., geographic origin 108-1). Message delay line system 104 may then determine the participant delay offset ($T_{participant}$) based on the identified information (e.g., sender and geographic origin) and the common delay time ($T_{delay}$) such as via a look-up table. System 104 may then determine the departure time for the timestamped message based on equation (1).

Message delay line system 104 may assign the timestamped message to a position in a message queue (e.g., message queue 206 shown in FIG. 2) according to the departure time. As discussed further below with respect to FIG. 5, by arranging the messages in the message queue according to departure time, messages may be ordered differently in the message queue compared with message arrival time (e.g., re-ordered), and may leave the message queue in a different order compared to the order in which the messages are received by message delay line system 104. System 104 may transmit a message in the message queue to the destination (e.g., downstream system 106) based on the departure time ($T_{departure}$).

It is understood that system 104 may include two or more message queues. For example, one message queue may be assigned to incoming messages from participant devices 102 (and in some examples, other downstream system(s)) for transmission to downstream system 106. A separate message queue may be assigned to outgoing messages from downstream system 106 for transmission to participant devices 102 (as well as any to any other downstream systems).

In some examples, message delay line system 104 and downstream system 106 may be embodied on a single computing device. In other examples, message delay line system 104 and downstream system 106 may refer to two or more computing devices distributed over several physical locations, connected by one or more wired and/or wireless links. It should be understood that message delay line system 104 refers to a computing system having sufficient processing and memory capabilities to perform the following specialized functions. Message delay line system 104 is described further below, according to FIG. 2.

Figure 2:
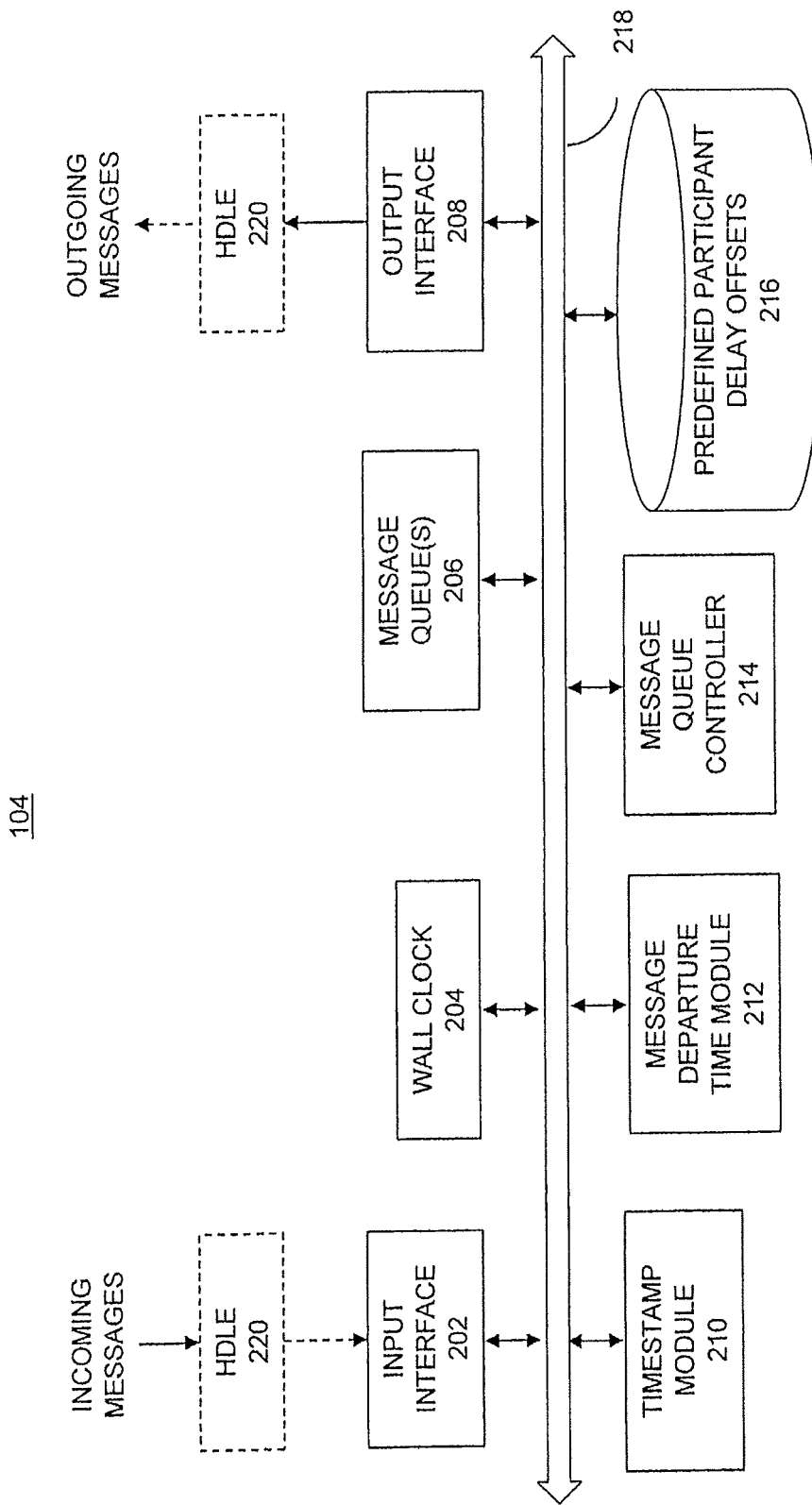
FIG. 2 is a functional block diagram of an example message delay line system according to an aspect of the present disclosure.

FIG. 2 is a functional block diagram of example message delay line system 104, according to an aspect of the present disclosure. Message delay line system 104 may include input interface 202, wall clock 204, at least one message queue 206, output interface 208, timestamp module 210, message departure time module 212, message queue controller 214 and storage 216, which may communicate with each other via data and control bus 218. Message queue controller 214 may include, for example, a processor, a microcontroller, a circuit, software and/or other hardware component(s) specially configured to control operation of input interface 202, wall clock 204, message queue(s) 206, output interface 208, timestamp module 210, message departure time module 212 and storage 216.

Input interface 202 may represent any electronic device or application on an electronic device configured to receive incoming messages from various sender entities (e.g., participant devices 102, downstream system 106, other downstream system(s)) via at least one network. In some examples, input interface 202 may be configured to securely communicate with one or more of the sender entities. In some examples, input interface 202 may be configured to communicate with various sender entities via a wired or wireless connection.

Timestamp module 210 may be configured to apply a timestamp to an incoming message received at input interface 202, via wall clock 204. Wall clock 204 may include any suitable local clock circuit for identifying a time of receipt of the incoming message by system 104 via input interface 202.

Message departure time module 212 may be configured to determine a departure time for the timestamped message, based on equation (1). Message departure time module 212 may identify a participant 102 and a geographical origin 108 from the timestamped message, and may determine the common time delay and the participant delay offset associated with the identified information (participant and geographical origin) from predefined information stored in storage 216. The retrieved information from storage 216 may be used to determine the departure time for the timestamped message.

Message queue controller 214 may be configured to assign each incoming (timestamped) message to message queue(s) 206 based on the departure time determined by module 212. Message queue controller 214 may order incoming messages, for example, in an order such that a message with a shortest departure time is positioned at the head of message queue 206 and a message with a longest departure time is positioned at the bottom of message queue 206. In some examples, message queue controller 214 may include more than one message at a same position of message queue(s) 206, for example, when two or more messages have a same departure time. Message queue 206 may be configured with any suitable architecture for storing electronic messages and providing an asynchronous communication protocol.

Message queue controller 214 may also be configured to remove one or more messages in message queue(s) 206, transmit the removed message(s) to a destination entity (e.g., downstream system 106, participant device(s) 102, another downstream system) via output interface 208, and rearrange (e.g., update) the entries in message queue(s) 206. For example, message queue controller 214 may compare the current wall clock time from wall clock 204 with the departure time for the message(s) at the head of message queue 206. When the current wall clock time ($T_{current}$) is greater than the departure time ($T_{departure}$) for the head message(s), the head message(s) may be removed from message queue 206.

Output interface 208 may represent any electronic device or application on an electronic device configured to output the transmitted message(s) (at the departure time) to destination entities (e.g., downstream system 106, participant device(s) 102, another downstream system) via at least one network. In some examples, output interface 208 may be configured to communicate with destination entities via a wired or wireless connection. In some examples, output interface 208 may be configured to securely communicate with one or more of the destination entities. In some examples, input interface 202 and output interface 208 may represent separate interfaces. In some examples, input interface 202 and output interface 208 may represent a single input/output (I/O) interface.

Storage 216 may include any suitable non-transitory storage medium and may be configured to store predefined participant delay offsets $T_{participant}$ (e.g., GDCs) associated with each participant device 102, as well as any other downstream systems. Storage 216 may also store a predetermined common delay time ($T_{delay}$) that may be equally applied to all participant devices 102 (and other downstream systems).

In some examples, message delay line system 104 may include one or more hardware delay line elements (HDLEs) 220. HDLE 220 may represent a hardware-based device having one or more hardware delay components (such as hardware delay component 1006 of HDLE 1004 in FIG. 10) configured to apply a predefined delay to an electronic message. Examples of suitable hardware delay components may include, without being limited to, a spool of electrical wire, a spool of optical fiber and an electronic device comprising a non-transitory memory. The predefined delay of the hardware component may correspond to a participant delay offset. HDLE 220 may be configured with a plurality of predefined delays associated with different participant delay offsets. In operation, participant devices 102 may be assigned to different hardware components. For example, participant device 102-1 may be assigned to hardware component 1006-1 having participant 1 delay offset and participant device 102-2 may be assigned to hardware component 1006-2 having a participant 2 delay (e.g., a different predefined delay). In some examples, the predefined delay may correspond to the departure time ($T_{departure}$) that is the combination of the common delay time ($T_{delay}$) and the participant delay offset ($T_{participant}$)

In some examples, HDLE 220 may be provided prior to input interface 202 message delay line system, such that incoming messages are subjected to a hardware-based delay prior to the application of any software-based delay by message departure time module 212 and message queue controller 214. In some examples, HDLE element 220 may be placed in system 104 after output interface 208, such that outgoing messages are subjected to a hardware-based delay after the application of any software-based delay by message departure time module 212 and message queue controller 214. In some examples, the hardware-based delay by HDLE 220 may replace at least some of the functions of message departure time module 212, and message queue controller 214 may position messages in message queue(s) 206 in the order in which the messages are received (based on the output from timestamp module 210). Thus, in some examples, message delay line system 104 may only apply a software-based delay (i.e., system 104 may not include HDLE element 220), may apply a combination of software and hardware-based delay (i.e., system 104 may include element 220 at input interface 202 and/or output interface 208) or may apply only a hardware based delay (i.e., HDLE 220 may replace at least some of the functions of message departure time module 212 in system 104).

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Those skilled in the art will appreciate that message delay line system 104 may be configured with more or less modules to conduct the methods described herein with reference to FIGS. 3, 4, 6, 11 and 12. As illustrated in FIGS. 3, 4, 6, 11 and 12, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 3, 4, 6, 11 and 12 may be performed by one or more specialized processing components associated with components 202-218 of message delay line system 104 of FIG. 2.

Figures 3, 4:
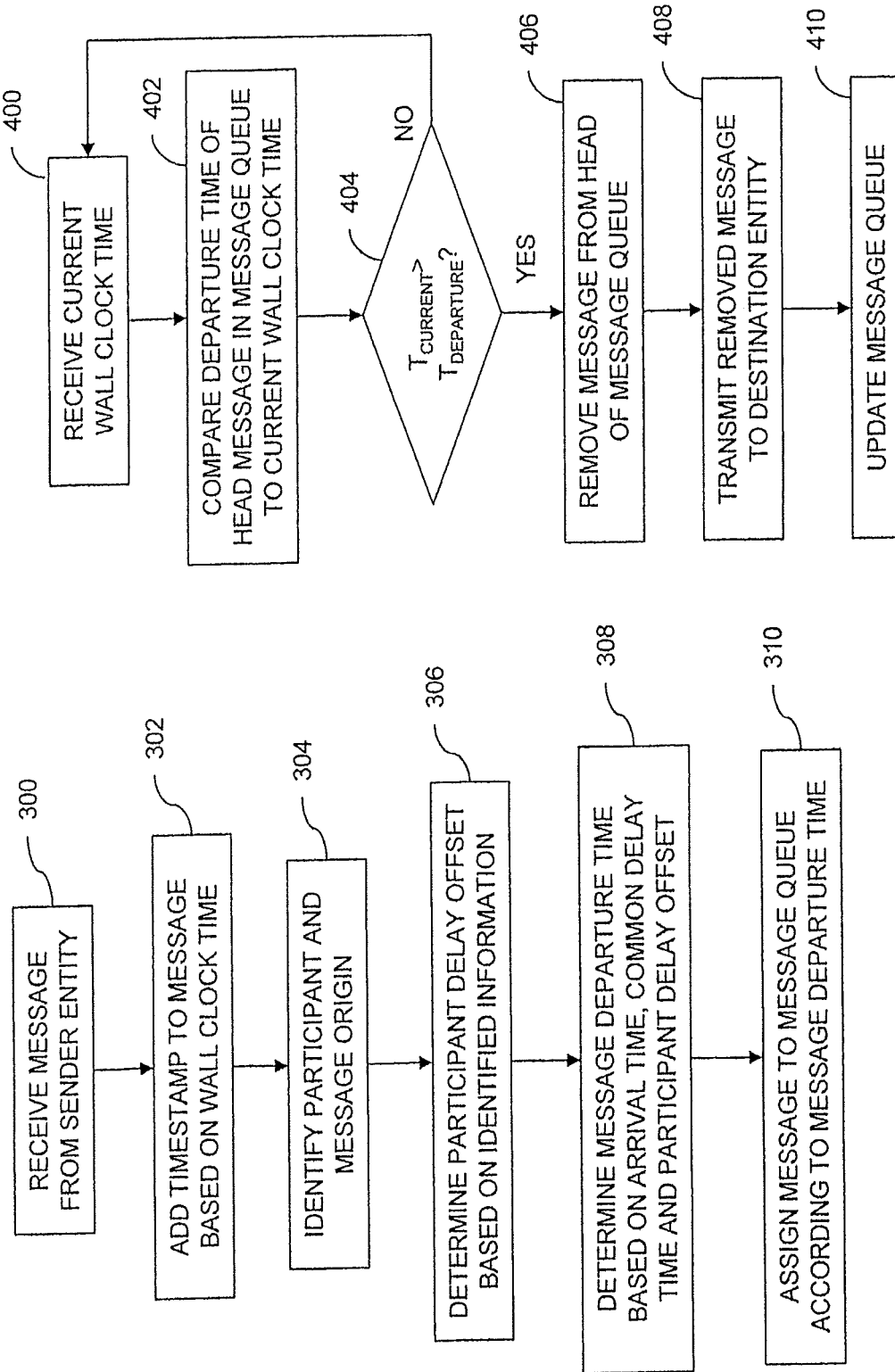
FIG. 3 is a flowchart diagram of an example method of assigning incoming messages to a message queue according to delayed message departure times associated with the electronic message communication environment shown in FIG. 1, according to an aspect of the present disclosure.
FIG. 4 is a flowchart diagram of an example method of transmitting messages to a destination entity via a message queue arranged according to a delayed message departure time associated with the electronic message communication environment shown in FIG. 1, according to an aspect of the present disclosure.

FIG. 3 illustrates a flowchart diagram of an example method of assigning incoming messages to message queue 206 according to delayed message departure times associated with electronic message communication environment 100 shown in FIG. 1, according to an aspect of the present disclosure. FIG. 4 is a flowchart diagram of an example method of transmitting messages to a destination entity via message queue 206 arranged according to a delayed message departure time associated with electronic message communication environment 100 shown in FIG. 1, according to an aspect of the present disclosure. FIGS. 3 and 4 are described with reference to FIGS. 1 and 2. FIGS. 3 and 4, collectively, illustrate a method for controlling electronic messages transmissions routed from various geographical origins such that the messages arrive at a destination entity at similar times. FIG. 3 illustrates an example of message delay system 104 without HDLE 220. An example of message delay system 104 with HDLE 220 is described further below in FIG. 6.

At step 300, message delay line system 104 may receive an electronic message from among one or more sender entities (for example, from among participant(s) device 102, downstream system 106 or another downstream system) via input interface 202. At step 302, timestamp module 210 may add a timestamp to the received electronic message based on a current wall clock time, for example, via wall clock 204.

At step 304, message departure time module 212 may identify a participant and a message origin included in the electronic message (e.g., from information in the message header). In some examples, the sender entity of the message may correspond to the participant (for example, for electronic messages sent from participant devices 102 to downstream system 106). In some examples, the destination entity of the message may correspond to the participant (for example, for electronic messages sent from downstream system 106 to participant devices 102, for transmission at a departure time associated with geographical origin 108 of the participant device 102).

At step 306, message departure time module 212 may determine a participant delay offset ($T_{participant}$) based on the identified information, for example, by querying storage 216. At step 308, message departure time module 212 may determine the departure time for the message, based on the timestamped arrival time (step 302), the common (predefined) delay time ($T_{delay}$) and the participant delay offset, according to equation 1.

At step 310, message queue controller 214 may assign the message to a particular position in message queue(s) 206 according to the message departure time (step 308).

At step 400, message queue controller 214 may receive the current wall clock time ($T_{current}$), for example, via wall clock 204. At step 402, message queue controller 214 may compare a departure time ($T_{departure}$) for a message positioned at the head of message queue 206 to the current wall clock time.

At step 404, message queue controller 214 may determine whether the current wall clock time ($T_{current}$), is greater than the message departure time ($T_{departure}$). When $T_{current}$ is not greater than (i.e., less than or equal to) $T_{departure}$, step 404 proceeds to step 400.

When $T_{current}$ is greater than $T_{departure}$, step 404 proceeds to step 406. At step 406, message queue controller 214 removes the message associated with the departure time from a head position of message queue 206. At step 408, message queue controller 214 may transmit the (removed) message to a destination entity, for example, via output interface 208. At step 410, message queue controller 214 may update the arrangement of messages remaining in message queue(s) 206.

Figure 5:
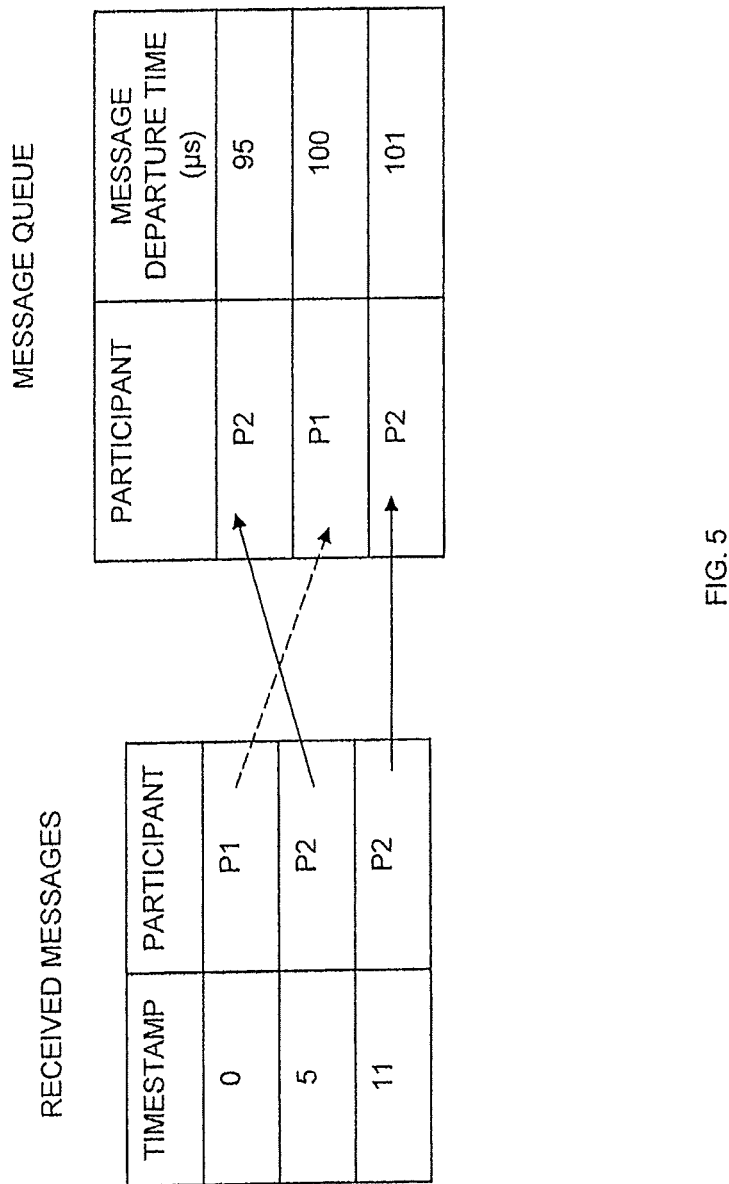
FIG. 5 is an example of a re-ordering of incoming messages into a message queue such that the messages include a delayed message departure time based on a predefined participant delay offset, according to an aspect of the present disclosure.

Referring next to FIG. 5, an example is shown of a re-ordering of incoming messages into message queue 206 according to a delayed message departure time that is based on a participant delay offset, according to an aspect of the present disclosure. In the example, participant device 102-1 (P1) is co-located at downstream system 106. Thus, P1's participant delay offset ($T_{participant}$(P1)) may be set to 0 μs. Participant device 102-2 (P2) may have a geographical origin 108-2 that is 1 km away from downstream system 106. P2's participant delay offset $T_{participant}$(P2) may be set to 10 μs. Furthermore, in this example, the common delay time ($T_{delay}$) may be set to 100 μs.

At Wall Clock 0, system 104 may receive an electronic message from P1, and may determine P1's message departure time ($T_{departure}$) from equation (1) as 100 μs (i.e.: 0+100−0=100 μs). If, at Wall Clock 5, system 104 receives a message from P2, system 104 may determine P2's message departure time ($T_{departure}$) as 95 μs (i.e.: 5+100−10=95 μs). As shown in FIG. 5, the messages for P1 and P2 are placed in message queue 206 according to their respective departure times. Assuming that no other messages are received, then, at Wall Clock 95 μs, P2's message is the first message to be transmitted by system 104. At Wall Clock 100 μs, system 104 then transmits P1's message.

Assuming that system 104 subsequently receives a message from P2 at Wall Clock 11, system 104 may determine $T_{departure}$ for P2's second message as 101 μs (i.e.: 11+100−10=101 μs). If no other messages are received, system 104 transmits P2's second message at wall clock 101 (after P1's message that is transmitted at Wall Clock 100).

In contrast, without the participant-specific delay offset, the order of the messages that would be received by downstream system 106 would be the order in which the messages are received (e.g., the left table). For example, P1 at Wall Clock 100 ($T_{arrival}+T_{delay}$), P2 at Wall Clock 105 (corresponding to arrival time 5 µs) and P2 at 111 (corresponding to arrival time 11 µs).

Figure 6:
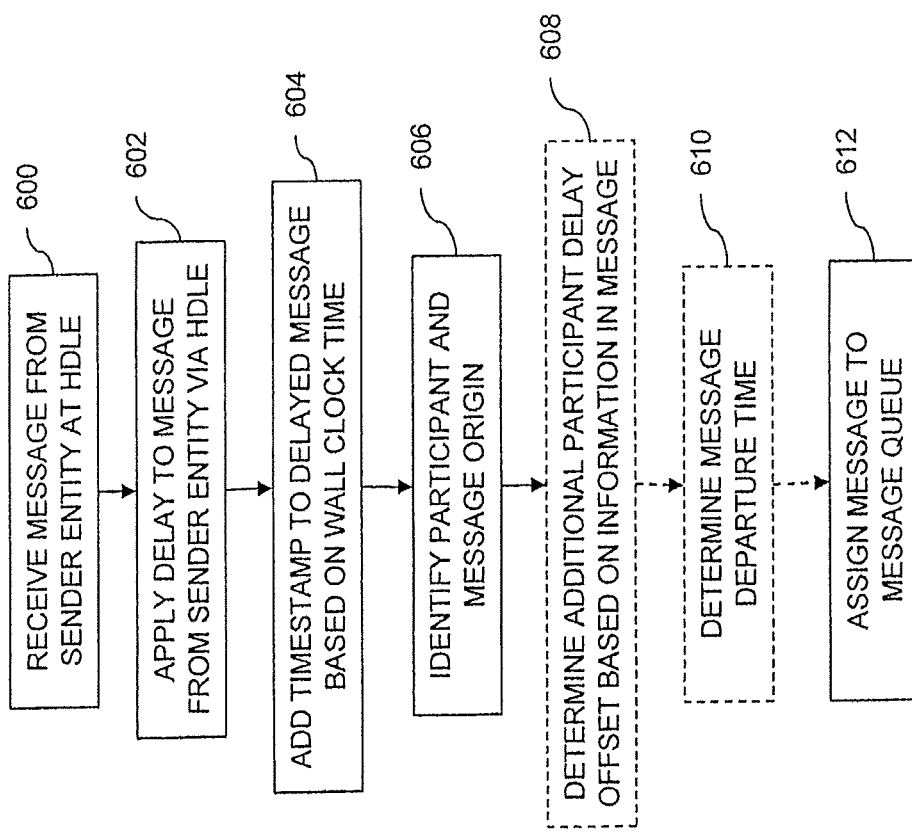
FIG. 6 is a flowchart diagram of an example method of transmitting messages to a destination entity according to a delayed message departure time associated with the electronic message communication environment shown in FIG. 1, according to another aspect of the present disclosure.

FIG. 6 illustrates a flowchart diagram of an example method of assigning incoming messages to message queue 206 such that the messages include a delayed message departure times associated with electronic message communication environment 100 shown in FIG. 1, according to an aspect of the present disclosure. In particular, FIG. 6 illustrates one or more examples of message delay system 104 including HDLE 220. FIG. 6 is described with reference to FIGS. 1 and 2.

At step 600, HDLE 220 of message delay line system 104 may receive an electronic message from among one or more sender entities (for example, from among participant(s) device 102, downstream system 106 or another downstream system). At step 602, HDLE 220 may apply a predefined delay to the received electronic message. The predefined delay may include the participant delay offset or the departure time. At step 604, timestamp module 210 may receive the delayed message (from HDLE 220 via input interface 202) and add a timestamp to the received electronic message based on a current wall clock time, for example, via wall clock 204.

At step 606, message departure time module 212 may identify a participant and a message origin included in the electronic message (e.g., from information in the message header). In some examples, the sender entity of the message may correspond to the participant (for example, for electronic messages sent from participant devices 102 to downstream system 106). In some examples, the destination entity of the message may correspond to the participant (for example, for electronic messages sent from downstream system 106 to participant devices 102, for transmission at a departure time associated with geographical origin 108 of the participant device 102).

At optional step 608, message departure time module 212 may determine an additional participant delay offset based on information in the received message. At optional step 610, message departure time module 212 may determine the departure time for the message. For example, the departure time may be determined based on the timestamped arrival time and the common (predefined) delay time ($T_{delay}$) (because the participant delay is applied by HDLE 220). In another example, the departure time may further include the optional additional participant delay offset (step 608). In some examples, step 610 may not be performed, for example, when HDLE 220 applies the departure time delay to the incoming message (at step 602).

At step 612, message queue controller 214 may assign the message to a particular position in message queue(s) 206. In some examples, the message may be assigned to the message queue(s) 206 in the order it is received (when HDLE 220 applies a predefined delay corresponding to the departure time. In some examples, the message may be assigned to the message queue(s) 206 according to the message departure time (determined at optional step 610). Step 612 may proceed to step 400 in FIG. 4.

In some examples (not shown in FIG. 6), steps 604-612 may be performed first (without step 600) and HDLE 220 may apply a hardware delay to the outgoing message (e.g., after step 408 in FIG. 4). In some examples, steps 600-612 may be performed, and an additional hardware delay may be applied by HDLE 220 to the outgoing message (e.g., after step 408 in FIG. 4).

Referring next to FIGS. 6-12, examples of system configurations and methods for determining and applying the participant delay offset in environment 100 are described. In general, to determine the participant delay offset, a packet data path between participant 102 and downstream system 106 may be considered. In particular, the travel time for a packet along a packet data path between a client ingress point (CIP) and a downstream system ingress point (DIP) may be determined. The CIP may be defined as any point beyond which a participant has no control of the packet data path. The DIP may be defined as the point closest to downstream system 106, past which all participant devices 102 have equal access time to message delay system 104.

Figure 7:
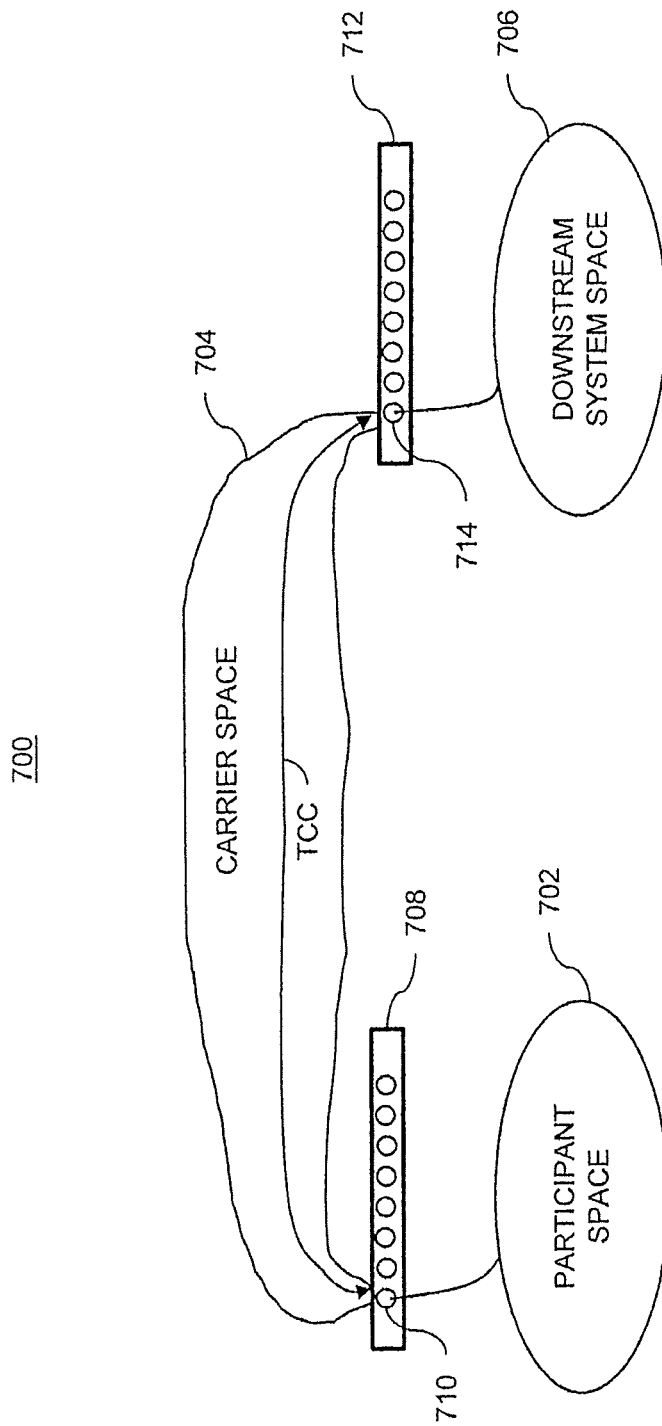
FIG. 7 is a functional block diagram of an example passive client ingress point (CIP) configuration for measuring participant delay offset associated with the electronic message communication environment shown in FIG. 1, according to an aspect of the present disclosure.
Figure 8:
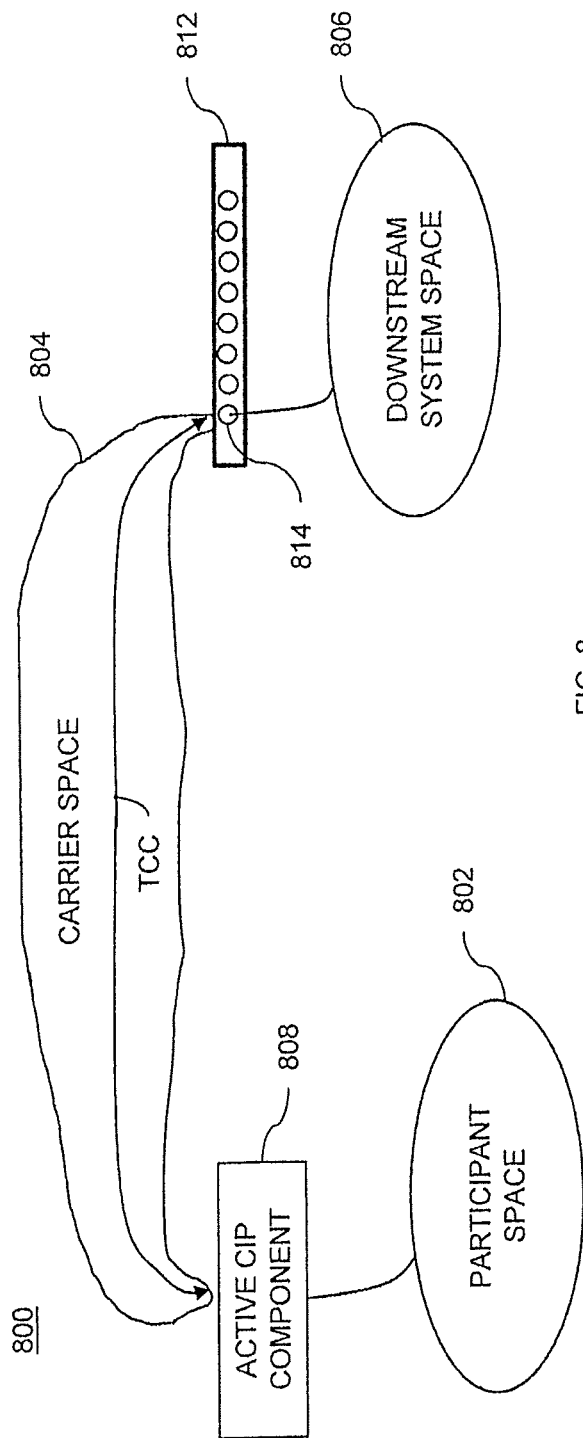
FIG. 8 is a functional block diagram of an example active CIP configuration for measuring participant delay offset associated with the electronic message communication environment shown in FIG. 1, according to another aspect of the present disclosure.

FIGS. 7 and 8 illustrate functional block diagrams of example passive and active CIP configurations for measuring the participant delay offset.

Referring to FIG. 7, an example passive CIP configuration 700 for measuring participant delay offset is shown. Passive CIP configuration 700 may include patch panel 708 having one or more passive CIPs 710 coupled to participant space 702 and patch panel 712 having one or more DIPs 714 coupled to downstream system space 706. CIP 710 (via patch panel 708) and DIP 714 (via patch panel 712) may be coupled to carrier space 704, such that client space 702 and downstream system space 706 may be configured to exchange data packets (e.g., via electronic messages) via carrier space 704. In general, patch panels 708, 712 each represent a mounted hardware assembly comprising one or more ports in a local area network (LAN) used to connect and manage incoming and outgoing LAN cables.

The data path between CIP 710 and DIP 714 in carrier space 704 is defined herein as a total cross-connect (TCC). The time to send a packet along the TCC in carrier space 704 may be represented as a TCC propagation delay. The participant delay offset may be determined by measuring the TCC propagation delay.

In general, a passive client does not have any active CIP component. As a result, measurement of the TCC propagation delay may be performed under the control of downstream system space 706 and/or carrier space 704. In operation, the TCC propagation delay may be measured, for example, using an optical delay measurement device or network tester such as, without being limited to a T-1 bit error rate detector (T-BERD), at the time of provisioning the participant, and may assumed to be constant. As another example, the TCC propagation delay may be measured based on packet decoding techniques, such as using a precision time protocol (PTP), for example as defined in the IEEE 1588 standard. The measured TCC propagation delay may be associated with the participant, and stored as the participant delay offset, for example, in storage 216 (FIG. 2).

Non-limiting examples of passive CIP 710 may include a wiring closest on the client premises or a patch panel port in a client (participant) cabinet in a data center. The port may represent an official demarcation line in a data center, and may require a Letter of Authorization (LOA), signed by the client (participant) and the owner of a patch panel port on the downstream space 706 side or carrier space 704 side for a cross-connect line to a next patch panel. In another example, passive CIP 710 may include a patch panel in a "meet-me-room" on the client premises, with a similar LOA arrangement. In general, a patch panel may represent colocation of at least a portion of the participant's equipment with downstream system 106, whereas a "meet-me-room" may represent participant equipment located on some other premises than downstream system 106, such as client data center, with a hand-off to a client-independent entity in the "meet-meroom." In general passive CIP 710 may represent any point from which the TCC propagation delay may be fixed and not under client control.

Referring to FIG. 8, an example active CIP configuration 800 for measuring participant delay offset is shown. Active CIP configuration 800 may include active CIP component 808 coupled to participant space 802 and patch panel 812 having one or more DIPs 814 coupled to downstream system space 806. Active CIP component 808 and DIP 814 (via patch panel 812) may be coupled to carrier space 804, such that client space 802 and downstream system space 806 may be configured to exchange data packets (e.g., via electronic messages) via carrier space 804. Patch panel 812 is similar to patch panel 712 (described above).

Active CIP component 808 may include any device, card and/or circuit board through which data packets from participant space 802 pass through and which may be configured to communicate with downstream system space 806 (and which may be controlled by downstream system 106). In general, active CIP component 808 may include any device acting like a "bump-in-the-wire," through which participant data packets may pass through, and after which the participant has no control of the data path. In some examples, active CIP component 808 may be configured to affix time stamps to the data packets.

Non-limiting examples of active CIP component 808 may include a network interface card (NIC) (controlled by downstream system 106) on a participant-side server and a participant-side server (controlled by downstream system 106). In one non-limiting example, downstream system 106 may include an exchange, and active CIP component 808 may include an exchange-controlled NIC on the participant-side server and/or an exchange controlled client-side server such as a trading gateway.

For active CIP configuration 800, the TCC propagation delay may be measured by out-of-band techniques and/or in-band techniques. For example, with out-of-band techniques, message delay line system 104 may periodically ping active CIP component 808, in order to measure the TCC propagation delay, associate the measured TCC propagation delay with the participant and store the measured TCC propagation delay as the participant delay offset in storage, such as storage 216 (FIG. 2). With in-band techniques, active CIP component 808 may time-stamp each packet transmitted to message delay line system 104, and message delay line system 104 may compare the difference in time-stamps (between the time-stamp of active CIP component 808 and the time-stamp applied by time-stamp module 210 (FIG. 2) of message delay line system 104.

In general, passive CIP configuration 700 may be more efficient than active CIP configuration 800, because no client-side components are required for installation, and only one initial TCC propagation delay measurement may be obtained and used during message delay application. Active CIP configuration 800 represents a more complex configuration, including installation of an active CIP component 808 on the participant premises. Active CIP configuration 800, however, may provide more flexibility for environments where it is difficult to control the data packet path between the CIP and the DIP.

Figure 9:
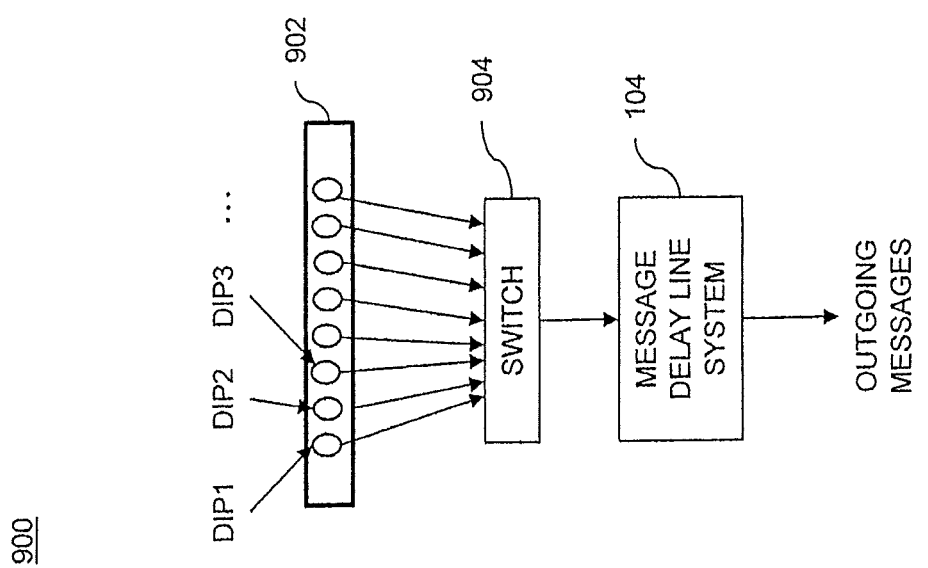
FIG. 9 is a functional block diagram of an example software delay line element (SDLE) system associated with the electronic message communication environment shown in FIG. 1, according to an aspect of the present disclosure.

Referring next to FIG. 9, in some examples, message delay line system 104 may represent a software delay element (SDLE) configured to apply a software-based delay to incoming messages on a participant-specific basis, according to the common time delay and the corresponding participant delay offset (eq. 1). In FIG. 9, a functional block diagram of an example SDLE system 900 comprising message delay line system 104 is shown, according to an embodiment of the present disclosure. System 900 may include patch panel 902, switch 904 and message delay line system 104. Patch panel 902 may include one or more DIPs (e.g., DIP1, DIP2 and DIP3) associated with downstream system 106. Patch panel 902 is similar to patch panels 712, 712 of downstream system spaces 706, 806.

SDLE system 900 may be configured to operate with passive CIP configuration 700 (FIG. 7) and/or active CIP configuration 800 (FIG. 8). In operation, messages from participant space 702, 802 that are transmitted over carrier space 704, 804, are received by patch panel 902 via one or more DIPs. The received messages may be routed to network switch 904 and then routed to message delay line system 104. Message delay line system 104 may apply a software-based delay and then transmit the outgoing delayed messages to downstream system 106 (as discussed above with respect to FIGS. 3 and 4).

For passive CIP configuration 700, software delay line system 106 may retrieve the participant delay offset from storage 216 that is measured at the time of participant provisioning, to determine the message departure time. For active CIP configuration 800, software delay line system 106 may use out-of-band and/or in-band techniques to periodically and/or continually measure the participant delay offset, to determine the message departure time.

Figure 10:
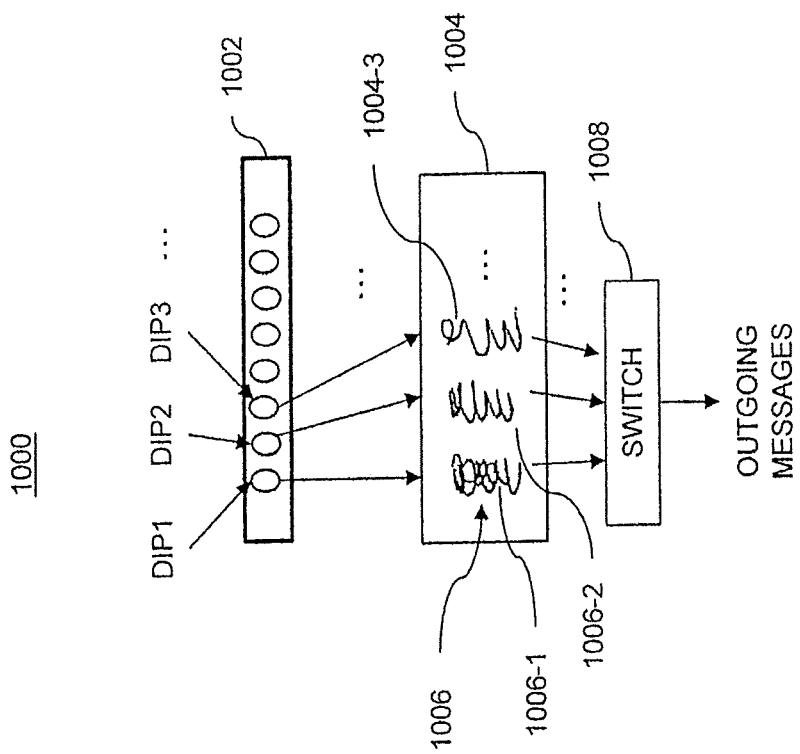
FIG. 10 is a functional block diagram of an example hardware delay line element (HDLE) system associated with the electronic message communication environment shown in FIG. 1, according to an aspect of the present disclosure.

Referring next to FIG. 10, in some examples, message delay line system 104 may include an HDLE configured to apply a hardware-based delay to incoming messages on a participant-specific basis, according to the common time delay and the corresponding participant delay offset. FIG. 10 illustrates a functional block diagram of an example HDLE system 1000, according to another embodiment of the present disclosure. System 1000 may include patch panel 102, HDLE 1004 and network switch 904. In some examples, system 1000 may include additional components of message delay line system 104 (such as message queue(s) 206). Patch panel 1002 may include one or more DIPs (e.g., DIP1, DIP2 and DIP3) associated with downstream system 106. Patch panel 1002 is similar to patch panel 712 of downstream system space 706.

In some examples, HDLE system 1000 may be configured to operate with passive CIP configuration 700 (FIG. 7). In operation, messages from participant space 702 transmitted over carrier space 704 is received by patch panel 1002 via one or more DIPs. The received messages may be routed to hardware components 1006, where each hardware component (e.g., components 1006-1, 1006-2, 1006-3) may be configured with different predefined delay times associated with different participants. In FIG. 10, hardware components 1006 are represented as spools of wire. It is understood that this represents a non-limiting example, and that other configurations of HDLE components 1006 may be used (as discussed above). In some examples, the predefined delay times of elements 1006 may be configured/selected to correspond to a participant delay offset measured during provisioning of an associated participant. In some examples, the predefined delay may be based on the common delay time and the participant delay offset (eq. 1). HDLE 1004 and patch panel 1002 may be arranged in a fixed configuration, for example, arranged at the time of participant provisioning. The delayed messages may be routed from HDLE 1004 to network switch 1008, and network switch 1008 may then control routing of the outgoing delayed messages to downstream system 106.

Figure 11:
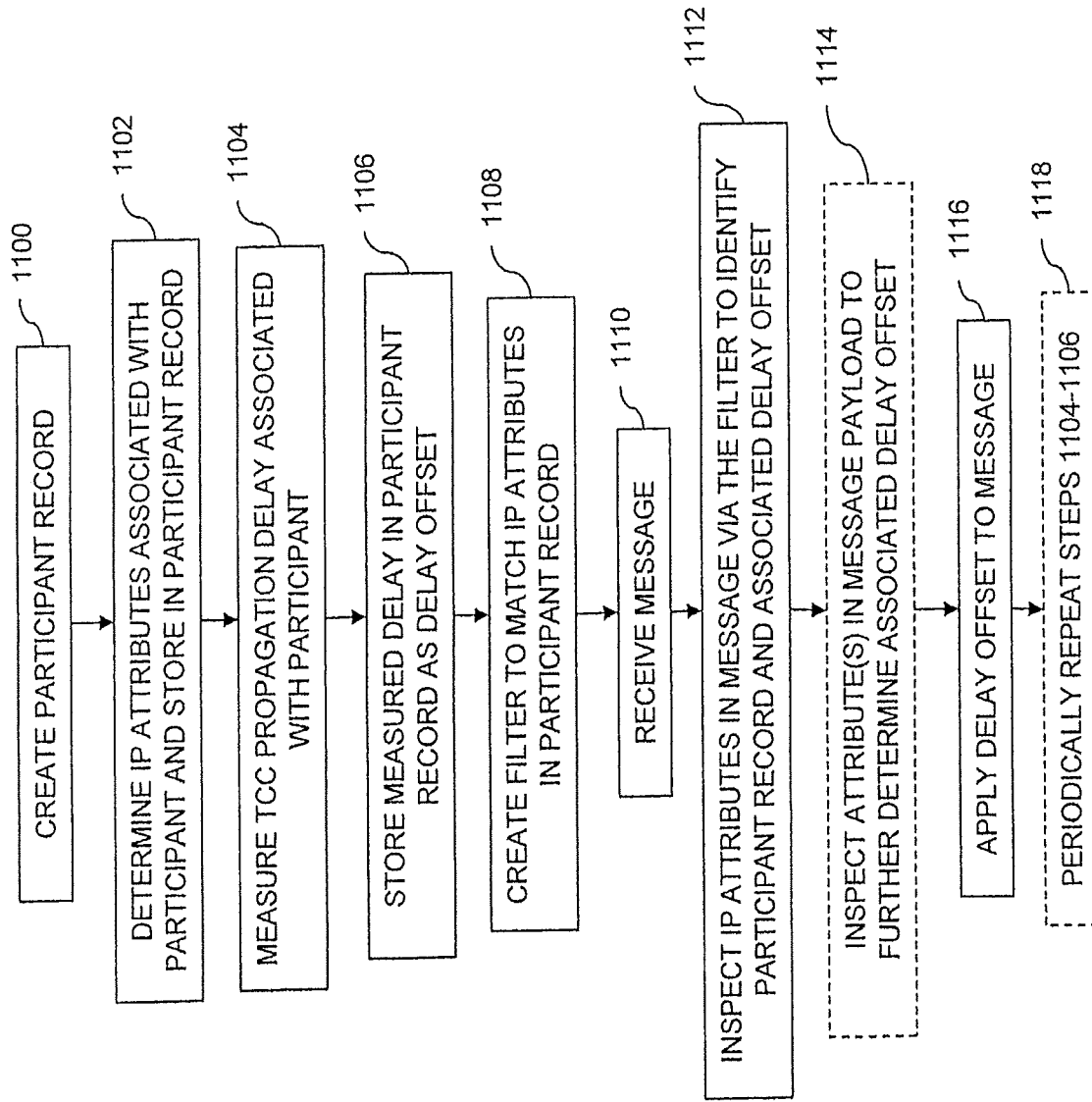
FIG. 11 is a flowchart diagram of an example method of determining and applying a participant delay offset to messages associated with the message delay line system shown in FIG. 2, according to an aspect of the present disclosure.

Referring next to FIG. 11, a flowchart diagram is shown of an example method of determining and applying a participant delay offset to messages associated with message delay line system 104, according to an embodiment of the present disclosure. FIG. 11 is described with reference to FIGS. 1, 2, 7 and 8. FIG. 11 illustrates determination of the participant delay offset for both an example passive CIP configuration 700 and an active CIP configuration 800 using out-of-band TCC delay measurement techniques.

At step 1100, a participant record for a particular participant device 102 (e.g., participant device 102-1) may be created, for example, at a time of provisioning the particular participant device 102. For example, message delay line system 104 (e.g., controller 214) may create a participant record for a particular participant device 102 (e.g., participant device 102-1), and store the participant record in storage 216. As another example, downstream system 106 may create the participant record, and may provide the participant record to storage 216 of message delay line system 104.

At step 1102, internet protocol (IP) attributes associated with the participant device 102 (e.g., participant device 102-1) may be determined, at the provisioning time, and stored in the participant record (created at step 1100). For example, IP version 4 (v4) attributes such as source IP address (src), subnet mask (subnet), destination IP address (dest IP) and destination port (dest port) may be determined and stored in the participant record. For example, message delay line system (e.g., controller 214) may determine the IP attributes for the participant device 102. As another example, downstream system 106 may determine the IP attributes and store the attributes in the participant record (in storage 216). In one example, the participant record may store the IP attributes in a format such as: src subnet/dest IP/dest port. At step 1102, an application platform (e.g., at downstream system 106 or message delay line system 104) may also allocate a unique port (e.g., IP:PORT) per participant associated with the application platform.

At step 1104, the TCC propagation delay for the participant device 102 may be initially measured at the provisioning time (e.g., prior to message transmissions). For example, in passive CIP configuration 700, the TCC propagation delay may be measured, e.g., using an optical delay measurement technique and/or a delay measurement via packet decoding. As another example, in active CIP configuration 800 with an out-of-band technique, downstream system 106 or message delay line system 104 (e.g., message departure time module) may ping active CIP component 808 to determine the TCC propagation delay.

At step 1106, the measured TCC propagation delay (step 1104) may be stored in the participant record (in storage 216) as the participant delay offset, for association with the particular participant. In passive CIP configuration 700, the initially stored participant delay offset may be considered a predetermined participant delay offset, and this predetermined (fixed) value may be used during the message delay process by message delay line system 104 (described above in FIGS. 3 and 4). In some examples, steps 1100-1106 may represent provisioning steps for each participant device 102, prior to participation in message exchange in environment 100.

At step 1108, message delay line system 104 (e.g., via controller 214) may create a filter to match IP attributes to a particular participant and participant record. At step 1110, message delay line system 104, via input interface 202, may receive an electronic message from among participant devices 102. At step 1112, message delay line system 104 may apply the created filter (step 1108) to the received message, to inspect the IP attributes, identify the associated participant record in storage 216 and identify the participant delay offset in the participant record (stored at step 1106). In some examples, the IP attributes may be identified from the message header. Thus, the IP attributes may be identified without deep packet inspection. Accordingly, message delay line system may identify some contents of the message (e.g., port and IP address, port alone, other message contents) to identify the source of the message and extract the participant delay offset from the participant record.

At optional step 1114, the message payload may be inspected to identify one or more TCC-related attributes, for example, by message departure time module 212. Example TCC-related attributes may include, without being limited to, a participant identifier (ID), data type (e.g., order type), etc. The TCC-related attributes may also be applied to the participant delay offset (determined in step 1112), to modify the participant delay offset, under some conditions or may selectively apply the participant delay offset. For example, the participant delay offset may include more than one value, with each value associated with a different TCC-related attribute. In another example, the participant delay offset may be applied a predetermined weighting based the identified TCC-related attribute.

At step 1116, message delay line system 104 may apply the participant delay offset to the received message, as described above with respect to FIGS. 3 and 4.

At optional step 1118, steps 1104-1106 may be repeated periodically, for example, when active CIP configuration 800 is used with out-of-band TCC measurement techniques. Steps 1108-1116 (and optional step 1118) may represent message delay application steps for each participant device 102 during participation in message exchange in environment 100.

Next, an example non-limiting scenario for provisioning and delay application during message exchange for passive CIP configuration 700 is provided. A participant identified as "baml" may include equipment collocated with downstream system 106 in Mahwah, N.J., for example, in wiring cabinet 5. The participant may request a cross-connect to downstream system 106 (e.g., an exchange system). Downstream system 106 may create a LOA with a client cabinet patch panel port (CIP) and a downstream system side patch panel port (DIP) marked in the LOA. On the installation of the participant equipment, the TCC propagation delay may be measured (e.g., by T-BERD), and recorded in a participant record in storage 216 such as: TCC_record: baml_mahwah_cab01_port5, delay 10 usec. Next, the participant record may be expanded with additional IP and port information, such as 10.10.10.0/24 src subnet, 172.1.1.1:60010 IP:PORT.

At the start of message exchange (e.g., a start of a trading day), message delay line system 104 may activate the participant record (received from storage 216), and may set up a filter to match the attributes. At a message arrival, message delay line system 104 may inspect IP:PORT and src_ip information and may identify the participant delay offset to be applied. Message delay line system 104 may also perform processes, such as inspecting the actual message payload, and extracting different attributes in the message payload (e.g., FIX 4.2 fields) to determine the participant delay offset that is applied to the participant's message.

Figure 12:
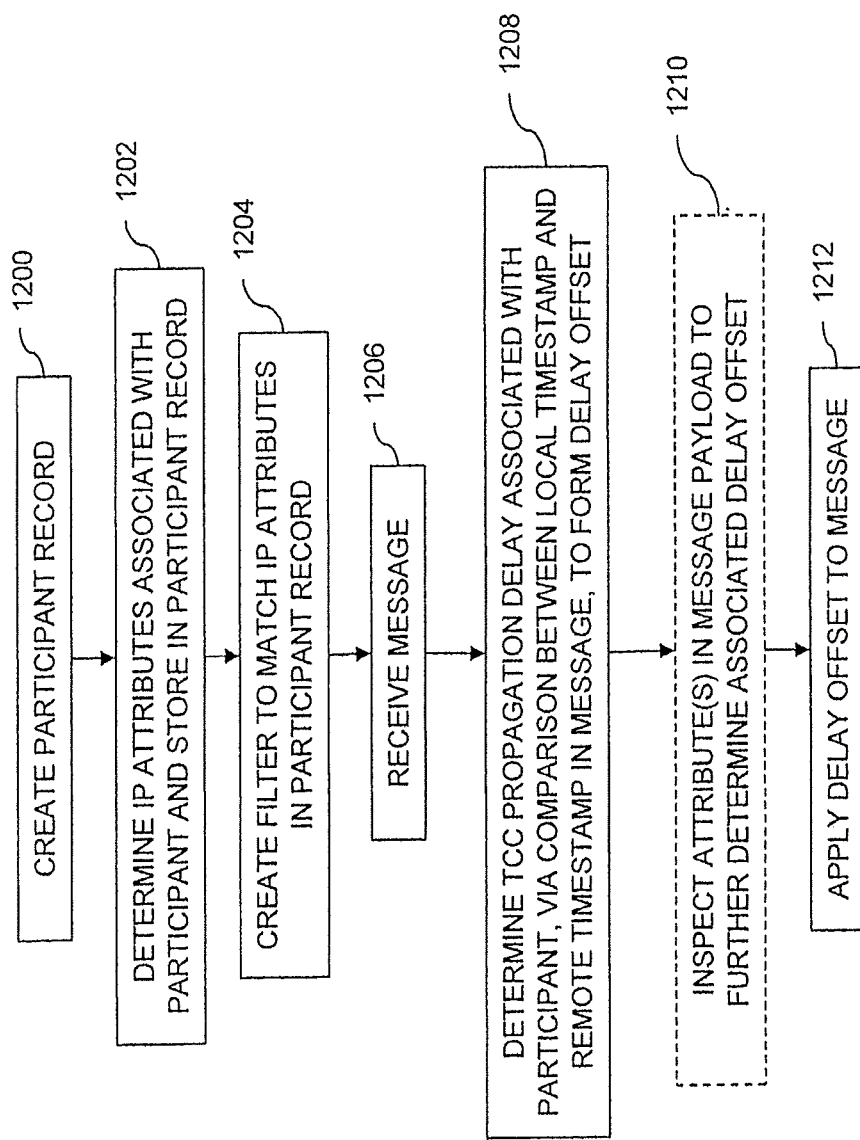
FIG. 12 is a flowchart diagram of an example method of determining and applying a participant delay offset to messages associated with the message delay line system shown in FIG. 2, according to another aspect of the present disclosure.

Referring next to FIG. 12, a flowchart diagram is shown of an example method of determining and applying a participant delay offset to messages associated with message delay line system 104, according to another embodiment of the present disclosure. FIG. 12 is described with reference to FIGS. 1, 2 and 8. FIG. 12 illustrates determination of the participant delay offset for an active CIP configuration 800 using in-band TCC delay measurement techniques.

At step 1200, a participant record for a particular participant device 102 (e.g., participant device 102-1) may be created, for example, at a time of provisioning the particular participant device 102, similar to step 1100 (FIG. 11). At step 1202, internet protocol (IP) attributes associated with the participant device 102 (e.g., participant device 102-1) may be determined, at the provisioning time, and stored in the participant record, similar to step 1102 (FIG. 11). At step 1202, an application platform (e.g., at downstream system 106 or message delay line system 104) may also allocate a unique port (e.g., IP:PORT) per participant associated with the application platform.

At step 1204, message delay line system 104 (e.g., via controller 214) may create a filter to match IP attributes to a particular participant and participant record. At step 1206, message delay line system 104, via input interface 202, may receive an electronic message from among participant devices 102. The received message may include a remote timestamp applied to the message by active CIP component 808 at participant space 802.

At step 1208, message delay line system (e.g., message departure time module 212) may determine the TCC propagation delay by comparing the local timestamp (applied to the received message by timestamp module 210 via wall clock 204) to the remote timestamp included in the received message (applied by active CIP component 808). In other words, a difference between the local timestamp and the remote timestamp may be used to measure the TCC propagation delay for the message associated with a participant. Message departure time module 212 may store the TCC propagation delay in the participant record (in storage 218) as the participant delay offset.

At optional step 1210, the message payload may be inspected to identify one or more TCC-related attributes, for example, by message departure time module 212, to modify and/or select the participant delay offset, similar to step 1114 (FIG. 11). At step 1212, message departure time module 212 may apply the participant delay offset to the received message. Thus, with in-band techniques, message delay line system 104 may measure the TCC propagation delay "on-the-fly," based on the local and remote timestamps with each received message.

Next, an example non-limiting scenario for provisioning and delay application during message exchange for active CIP configuration 800 with in-band delay measurement techniques is provided. A participant identified as "baml" may include equipment collocated with downstream system 106 in Mahwah, for example, in wiring cabinet 5. The participant may request a cross-connect to downstream system 106 (e.g., an exchange system). Downstream system 106 may provide participant baml with an NIC card (e.g., an active CIP component 808) 808) for communications with the downstream system 106. Every packet (message) passing through the NIC card may be time-stamped, such that at the reception of the packet at downstream system 106, message delay line system 104 may use the local time source (e.g., wall clock 204) to calculate the TCC propagation delay, based on the local and remote timestamps, and may identify the participant delay offset that is applied to the message of the participant. Message delay line system 104 may also perform processes, such as inspecting the actual message payload, and extracting different attributes in the message payload (e.g., FIX 4.2 fields) to determine the participant delay offset that is applied to the participant's message.

Systems and methods of the present disclosure may include and/or may be implemented by one or more specialized computers or other suitable components including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) and/or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the message delay line system and downstream system described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

FIG. 13 illustrates a functional block diagram of a machine in the example form of computer system 1300 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, participant devices 102, message delay line system 104 and/or downstream system 106 (FIG. 1) may be implemented by the example machine shown in FIG. 13 (or a combination of two or more of such machines).

Example computer system 1300 may include processing device 1302, memory 1306, data storage device 1310 and communication interface 1312, which may communicate with each other via data and control bus 1318. In some examples, computer system 1300 may also include display device 1314 and/or user interface 1316.

Processing device 1302 may include, without being limited to, a microprocessor, a central processing unit, an application specific integrated circuit (ASIC), a field programmable gate array (FPGA), a digital signal processor (DSP) and/or a network processor. Processing device 1302 may be configured to execute processing logic 1304 for performing the operations described herein. In general, processing device 1302 may include any suitable special-purpose processing device specially programmed with processing logic 1304 to perform the operations described herein.

Memory 1306 may include, for example, without being limited to, at least one of a read-only memory (ROM), a random access memory (RAM), a flash memory, a dynamic RAM (DRAM) and a static RAM (SRAM), storing computer-readable instructions 1308 executable by processing device 1302. In general, memory 1306 may include any suitable non-transitory computer readable storage medium storing computer-readable instructions 1308 executable by processing device 1302 for performing the operations described herein. Although one memory device 1308 is illustrated in FIG. 13, in some examples, computer system 1300 may include two or more memory devices (e.g., dynamic memory and static memory).

Computer system 1300 may include communication interface device 1312, for direct communication with other computers (including wired and/or wireless communication) and/or for communication with a network. In some examples, computer system 1300 may include display device 1314 (e.g., a liquid crystal display (LCD), a touch sensitive display, etc.). In some examples, computer system 1300 may include user interface 1316 (e.g., an alphanumeric input device, a cursor control device, etc.).

In some examples, computer system 1300 may include data storage device 1310 storing instructions (e.g., software) for performing any one or more of the functions described herein. Data storage device 1310 may include any suitable non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system comprising:
one or more processors operatively coupled to a non-transitory memory storing computer-readable instructions that, when executed by the one or more processors, cause the system to:
intercept, via a system input interface, an incoming message having a destination other than the system;
determine that the incoming message originated from a particular participant device associated with a particular configuration, the particular configuration comprising at least one of a passive client ingress point (CIP) configuration and an active CIP configuration;
determine a transmission delay offset according to the particular configuration associated with the particular participant device; and
apply the transmission delay offset to the incoming message prior to transmission of the incoming message from the system to the destination.

2. The system of claim 1, wherein the computer-readable instructions, when executed by the one or more processors, further cause the system to:
identify one or more internet protocol (IP) attributes of the incoming message; and
identify, based on the one or more IP attributes of the incoming message, the particular participant device,
wherein the transmission delay offset is specific to the particular participant device.

3. The system of claim 2, wherein the computer-readable instructions, when executed by the one or more processors, further cause the system to one or more of:
create a participant record associated with the particular participant device; and
receive the participant record associated with the particular participant device from a downstream system.

4. The system of claim 3, wherein the computer-readable instructions, when executed by the one or more processors, further cause the system to store the determined transmission delay offset in the participant record associated with the particular participant device.

5. The system of claim 3, wherein the computer-readable instructions, when executed by the one or more processors, further cause the system to:
store the one or more IP attributes in the participant record; and
store the participant record associated with the particular participant device in a system storage.

6. The system of claim 2, wherein the one or more IP attributes associated with the particular participant device comprise at least one of source IP address (src), subnet mask (subnet), destination IP address (dest IP) and destination port (dest port).

7. The system of claim 1, wherein the transmission delay offset comprises a total cross-connect (TCC) propagation delay for the particular participant device.

8. The system of claim 7, wherein the TCC propagation delay for the particular participant device is initially determined at a provisioning time of the particular participant device.

9. The system of claim 7, wherein the TCC propagation delay is determined by one or more of: an optical delay measurement, a delay measurement via packet decoding, an out-of-band technique, and pinging a CIP component associated with said particular participant device.

10. The system of claim 1, wherein the computer-readable instructions, when executed by the one or more processors, further cause the system to:
inspect a message payload of the incoming message;
identify one or more TCC-related attributes; and
modify the transmission delay offset based on the one or more TCC-related attributes.

11. The system of claim 10, wherein the one or more TCC-related attributes comprise one or more of participant identifier and data type.

12. The system of claim 1, wherein the computer-readable instructions, when executed by the one or more processors, further cause the system to:
allocate a unique port to the particular participant device.

13. The system of claim 1, wherein the computer-readable instructions, when executed by the one or more processors, further cause the system to:
create a filter; and
apply the filter to the incoming message to identify the one or more IP attributes of the incoming message.

14. The system of claim 1, wherein the system is configured to identify the one or more IP attributes of the incoming message by inspecting a message header of the incoming message.

15. A method comprising:
in a system comprising one or more processors operatively coupled to a non-transitory memory storing computer-readable instructions that, when executed by the one or more processors, cause the system to perform the steps of:
intercepting, via a system input interface, an incoming message having a destination other than the system;
determining that the incoming message originated from a particular participant device associated with a particular configuration, the particular configuration comprising at least one of a passive client ingress point (CIP) configuration and an active CIP configuration;
determining a transmission delay offset according to the particular configuration associated with the particular participant device; and
applying the transmission delay offset to the incoming message prior to transmission of the incoming message from the system to the destination.

16. The method of claim 15, further comprising:
identifying one or more internet protocol (IP) attributes of the incoming message; and
identifying, based on the one or more IP attributes of the incoming message, the particular participant device, wherein the transmission delay offset is specific to the particular participant device.

17. The method of claim 16, further comprising at least one of:
creating, by the system, a participant record associated with the particular participant device; and
receiving, by the system, the participant record associated with the particular participant device from a downstream system.

18. The method of claim 17, further comprising storing, by the system, the determined transmission delay offset in the participant record associated with the particular participant device.

19. The method of claim 17, further comprising:
storing, by the system, the one or more IP attributes in the participant record; and
storing, by the system, the participant record associated with the particular participant device in a system storage.

20. The method of claim 16, wherein the one or more IP attributes associated with the particular participant device comprise at least one of source IP address (src), subnet mask (subnet), destination IP address (dest IP) and destination port (dest port).

21. The method of claim 15, wherein the transmission delay offset comprises a total cross-connect (TCC) propagation delay for the particular participant device.

22. The method of claim 21, wherein the TCC propagation delay for the particular participant device is initially determined at a provisioning time of the particular participant device.

23. The method of claim 21, wherein the TCC propagation delay is determined by one or more of: an optical delay measurement, a delay measurement via packet decoding, an out-of-band technique, and pinging a CIP component associated with said particular participant device.

24. The method of claim 15, further comprising:
inspecting, by the system, a message payload of the incoming message;
identifying, by the system, one or more TCC-related attributes; and
modifying, by the system, the transmission delay offset based on the one or more TCC-related attributes.

25. The method of claim 24, wherein the one or more TCC-related attributes comprise one or more of participant identifier and data type.

26. The method of claim 15, further comprising:
allocating, by the system, a unique port to the particular participant device.

27. The method of claim 15, further comprising:
creating, by the system, a filter; and
applying, by the system, the filter to the incoming message to identify the one or more IP attributes of the incoming message.

28. The method of claim 15, wherein the system is configured to identify the one or more IP attributes of the incoming message by inspecting a message header of the incoming message.

* * * * *